United States Patent
Tanaka

(10) Patent No.: US 12,237,725 B2
(45) Date of Patent: Feb. 25, 2025

(54) ROTOR, ROTARY ELECTRIC MACHINE, AND DRIVE APPARATUS

(71) Applicant: NIDEC CORPORATION, Kyoto (JP)

(72) Inventor: Kuniaki Tanaka, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 224 days.

(21) Appl. No.: 17/950,101

(22) Filed: Sep. 22, 2022

(65) Prior Publication Data

US 2023/0102659 A1    Mar. 30, 2023

(30) Foreign Application Priority Data

Sep. 30, 2021    (JP) .................................. 2021-161654

(51) Int. Cl.
   *H02K 1/27*      (2022.01)
   *H02K 1/276*     (2022.01)
   *H02K 16/00*     (2006.01)

(52) U.S. Cl.
   CPC ......... *H02K 1/2766* (2013.01); *H02K 16/005* (2013.01)

(58) Field of Classification Search
   CPC . H02K 1/2766; H02K 16/005; H02K 2213/03
   See application file for complete search history.

(56) References Cited

U.S. PATENT DOCUMENTS

| 8,362,661 | B2 | 1/2013 | Deblock et al. |
| 9,088,189 | B2 | 7/2015 | Buskirk et al. |
| 2013/0270952 | A1* | 10/2013 | Jurkovic ............. H02K 1/2766 310/156.01 |
| 2016/0352161 | A1* | 12/2016 | Lange ................... H02K 1/246 |
| 2017/0317540 | A1* | 11/2017 | Laldin ................ H02K 1/2766 |
| 2018/0175681 | A1* | 6/2018 | Tang .................... H02K 1/2706 |
| 2022/0263361 | A1* | 8/2022 | Tang .................... H02K 1/2766 |

FOREIGN PATENT DOCUMENTS

| JP | H99537 A | 1/1997 |
| JP | 201941483 A | 3/2019 |

* cited by examiner

*Primary Examiner* — Thomas Truong
(74) *Attorney, Agent, or Firm* — HAUPTMAN HAM, LLP

(57) ABSTRACT

In a rotor, magnetic poles having a pair of first magnets and second magnets are provided along a circumferential direction. The magnetic pole includes a pair of first flux barrier portions radially outside the first magnets, and a pair of second flux barrier portions between the pair of first flux barrier portions in the circumferential direction. The first flux barrier portion has a first end close to the adjacent second flux barrier portion. The second flux barrier portion has a second end close to the adjacent first flux barrier portion. A relative position of the first end in the circumferential direction with respect to a circumferential center of the magnetic pole is different between the adjacent magnetic poles. A relative position of the second end in the circumferential direction with respect to the circumferential center of the magnetic pole is different between the adjacent magnetic poles.

14 Claims, 5 Drawing Sheets

ROTOR, ROTARY ELECTRIC MACHINE, AND DRIVE APPARATUS

CROSS-REFERENCE TO RELATED APPLICATIONS

The present invention claims priority under 35 U.S.C. § 119 to Japanese Patent Application No. 2021-161654 filed on Sep. 30, 2021, the entire content of which is incorporated herein by reference.

FIELD OF THE INVENTION

The present invention relates to a rotor, a rotary electric machine, and a drive apparatus.

BACKGROUND

A motor including a rotor core and a permanent magnet disposed in a magnet insertion hole provided in the rotor core is known. For example, a conventional motor includes a rotor core having a V-shaped magnet insertion hole.

In the motor as described above, it is known that the cogging torque is generated by the magnetic force of the permanent magnet. When the cogging torque is generated, there is a problem that noise and vibration of the motor increase. Therefore, it has been desired to reduce the cogging torque.

SUMMARY

One aspect of an exemplary rotor of the present invention is a rotor rotatable about a central axis, the rotor including a rotor core, and a plurality of magnets respectively accommodated in a plurality of magnet holes provided in the rotor core. The plurality of magnets include a pair of first magnets adjacent in a circumferential direction, and a second magnet located on a radially outer side of the pair of first magnets. The pair of first magnets extends in directions away from each other in the circumferential direction from a radially inner side toward the radially outer side when viewed in an axial direction. A plurality of magnetic poles having the pair of first magnets, at least one or more of the second magnets, and a part of the rotor core are provided along the circumferential direction. The magnetic pole includes a pair of first flux barrier portions each provided on the radially outer side of each of the first magnets along a direction in which each of the first magnets extends when viewed in the axial direction, and a pair of second flux barrier portions provided adjacent to the second magnet between the pair of first flux barrier portions in the circumferential direction and disposed adjacent to each of the pair of first flux barrier portions at intervals in the circumferential direction. The first flux barrier portion has a first end portion on a side close to the second flux barrier portion adjacent in the circumferential direction. The second flux barrier portion has a second end portion on a side close to the first flux barrier portion adjacent in the circumferential direction. A relative position of the first end portion in the circumferential direction with respect to a circumferential center of the magnetic pole is different between the magnetic poles adjacent in the circumferential direction. A relative position of the second end portion in the circumferential direction with respect to the circumferential center of the magnetic pole is different between the magnetic poles adjacent in the circumferential direction.

One aspect of an exemplary rotary electric machine according to the present invention includes the above rotor, and a stator that is opposite to the rotor with a gap interposed therebetween.

One aspect of an exemplary drive apparatus of the present invention includes the above rotary electric machine and a gear mechanism connected to the rotary electric machine.

The above and other elements, features, steps, characteristics and advantages of the present disclosure will become more apparent from the following detailed description of the preferred embodiments with reference to the attached drawings.

DETAILED DESCRIPTION

Figure 1:
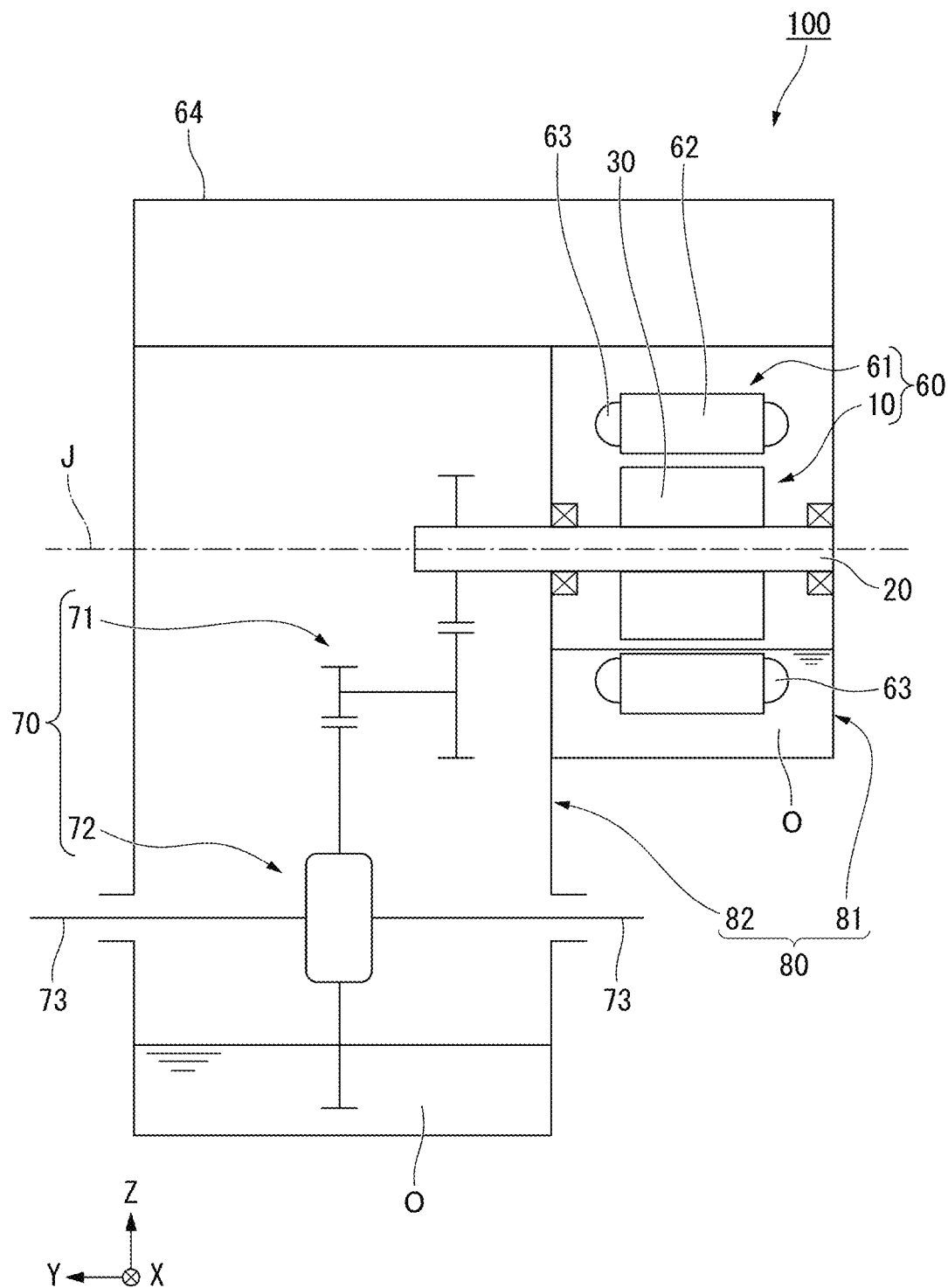
FIG. 1 is a diagram schematically illustrating a drive apparatus according to a first embodiment.

The following description will be made with a vertical direction being defined on the basis of positional relationships in a case where a drive apparatus according to an embodiment is installed in a vehicle located on a horizontal road surface. That is, it is sufficient that the relative positional relationships regarding the vertical direction described in the following embodiment are satisfied at least in the case where the drive apparatus is installed in the vehicle located on the horizontal road surface.

In the drawings, an XYZ coordinate system is illustrated appropriately as a three-dimensional orthogonal coordinate system. In the XYZ coordinate system, a Z-axis direction corresponds to the vertical direction. A +Z side is an upper side in the vertical direction, and a −Z side is a lower side in the vertical direction. In the following description, the upper side and the lower side in the vertical direction will be referred to simply as the "upper side" and the "lower side", respectively. An X-axis direction is orthogonal to the Z-axis direction and corresponds to a front-rear direction of the vehicle on which the drive apparatus is mounted. In the following embodiment, a +X side is a front side of the vehicle, and a −X side is a rear side of the vehicle. A Y-axis direction is a direction orthogonal to both the X-axis direction and the Z-axis direction, and is a left-right direction of the vehicle, i.e., a vehicle width direction. In the following embodiment, a +Y side corresponds to a left side in the vehicle, and a −Y side corresponds to a right side in the vehicle. Each of the front-rear direction and the left-right direction is a horizontal direction perpendicular to the vertical direction.

Note that the positional relationship in the front-rear direction is not limited to the positional relationship in the following embodiment, and the +X side may be the rear side of the vehicle and the −X side may be the front side of the vehicle. In this case, the +Y side corresponds to the right side of the vehicle, and the −Y side corresponds to the left side of the vehicle. In addition, a "parallel direction" in the present specification includes a substantially parallel direction, and an "orthogonal direction" includes a substantially orthogonal direction.

A central axis J illustrated in the drawings as appropriate is a virtual axis extending in a direction intersecting the vertical direction. More specifically, the central axis J extends in the Y-axis direction orthogonal to the vertical direction, i.e., in the left-right direction of the vehicle. In the following description, unless otherwise particularly stated, a direction parallel to the central axis J is simply referred to as an "axial direction", a radial direction about the central axis J is simply referred to as a "radial direction", and a circumferential direction about the central axis J, i.e., a direction around the central axis J is simply referred to as a "circumferential direction". An arrow θ appropriately illustrated in each figure indicates the circumferential direction. The arrow θ is directed in a clockwise direction around the central axis J when viewed from above.

A drive apparatus 100 of the present embodiment illustrated in FIG. 1 is a drive apparatus that is mounted on a vehicle and rotates an axle 73. The vehicle on which the drive apparatus 100 is mounted is a vehicle including a motor as a power source, such as a hybrid vehicle (HEV), a plug-in hybrid vehicle (PHV), or an electric vehicle (EV). As illustrated in FIG. 1, the drive apparatus 100 includes a rotary electric machine 60, a gear mechanism 70 connected to the rotary electric machine 60, a housing 80 that accommodates the rotary electric machine 60 and the gear mechanism 70 therein, and a control device 64 that controls the rotary electric machine 60. In the present embodiment, the rotary electric machine 60 is a motor.

The housing 80 accommodates the rotary electric machine 60 and the gear mechanism 70 therein. The housing 80 includes a motor housing 81 that accommodates the rotary electric machine 60 therein and a gear housing 82 that accommodates the gear mechanism 70 therein. In the present embodiment, oil O is accommodated in the motor housing 81 and the gear housing 82.

The gear mechanism 70 transmits the rotation of the rotary electric machine 60 to the axle 73 of the vehicle. The gear mechanism 70 includes a speed reduction device 71 connected to the rotary electric machine 60 and a differential device 72 connected to the speed reduction device 71. The axle 73 is connected to the differential device 72.

The rotary electric machine 60 includes a rotor 10 rotatable about a central axis J, and a stator 61 facing the rotor 10 with a gap interposed therebetween. In the present embodiment, the stator 61 is located on a radially outer side of the rotor 10. The stator 61 includes a stator core 62 and a plurality of coils 63 attached to the stator core 62.

Figure 2:
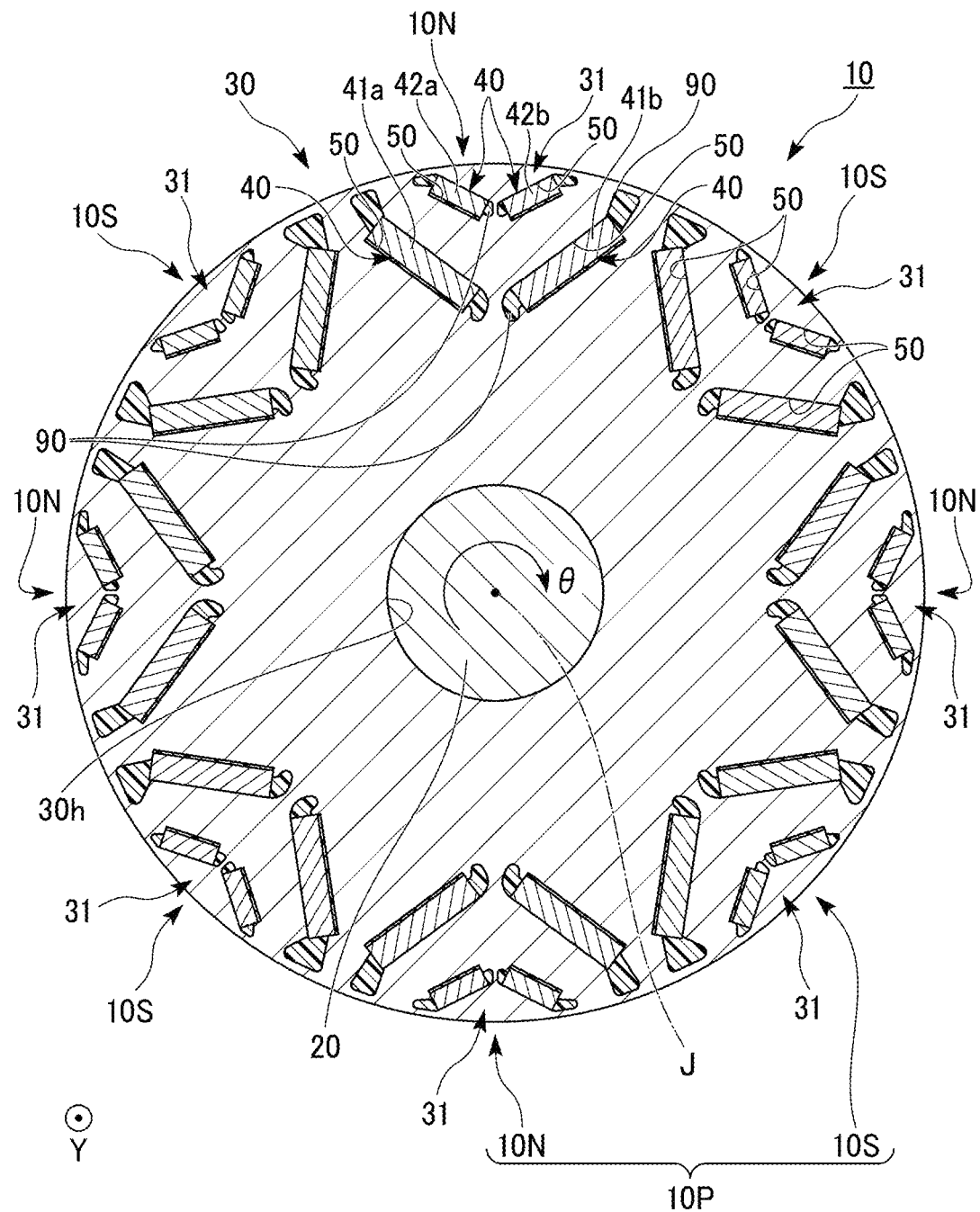
FIG. 2 is a cross-sectional view illustrating a rotor of the first embodiment.

The rotor 10 is, for example, a skewed rotor. Note that the rotor 10 may be a rotor that is not skewed. As illustrated in FIG. 2, the rotor 10 includes a shaft 20, a rotor core 30, and a plurality of magnets 40. As illustrated in FIG. 1, the shaft 20 extends in the axial direction centered on the central axis J. An end portion on the left side (+Y side) of the shaft 20 protrudes into the gear housing 82.

The rotor core 30 is fixed to the outer peripheral surface of the shaft 20. As illustrated in FIG. 2, the rotor core 30 has a columnar shape centered on the central axis J. The rotor core 30 has a central hole 30h axially penetrating the rotor core 30. The central hole 30h is a circular hole centered on the central axis J. The shaft 20 passes through the central hole 30h in the axial direction. The inner peripheral surface of the central hole 30h is fixed to the outer peripheral surface of the shaft 20.

The rotor core 30 is made of a magnetic body. Although not illustrated, the rotor core 30 includes a plurality of plate members laminated in the axial direction. The plurality of plate members constituting the rotor core 30 are electromagnetic steel plates, for example. The rotor core 30 includes a magnet holding portion 31 having a plurality of magnet holes 50. The magnet holding portion 31 is provided in a portion on a radially outer side of the rotor core 30. In the present embodiment, a plurality of magnet holding portions 31 are provided along the circumferential direction. The plurality of magnet holding portions 31 are disposed at equal intervals over the entire circumference along the circumferential direction. In the present embodiment, eight magnet holding portions 31 are provided.

Figure 3:
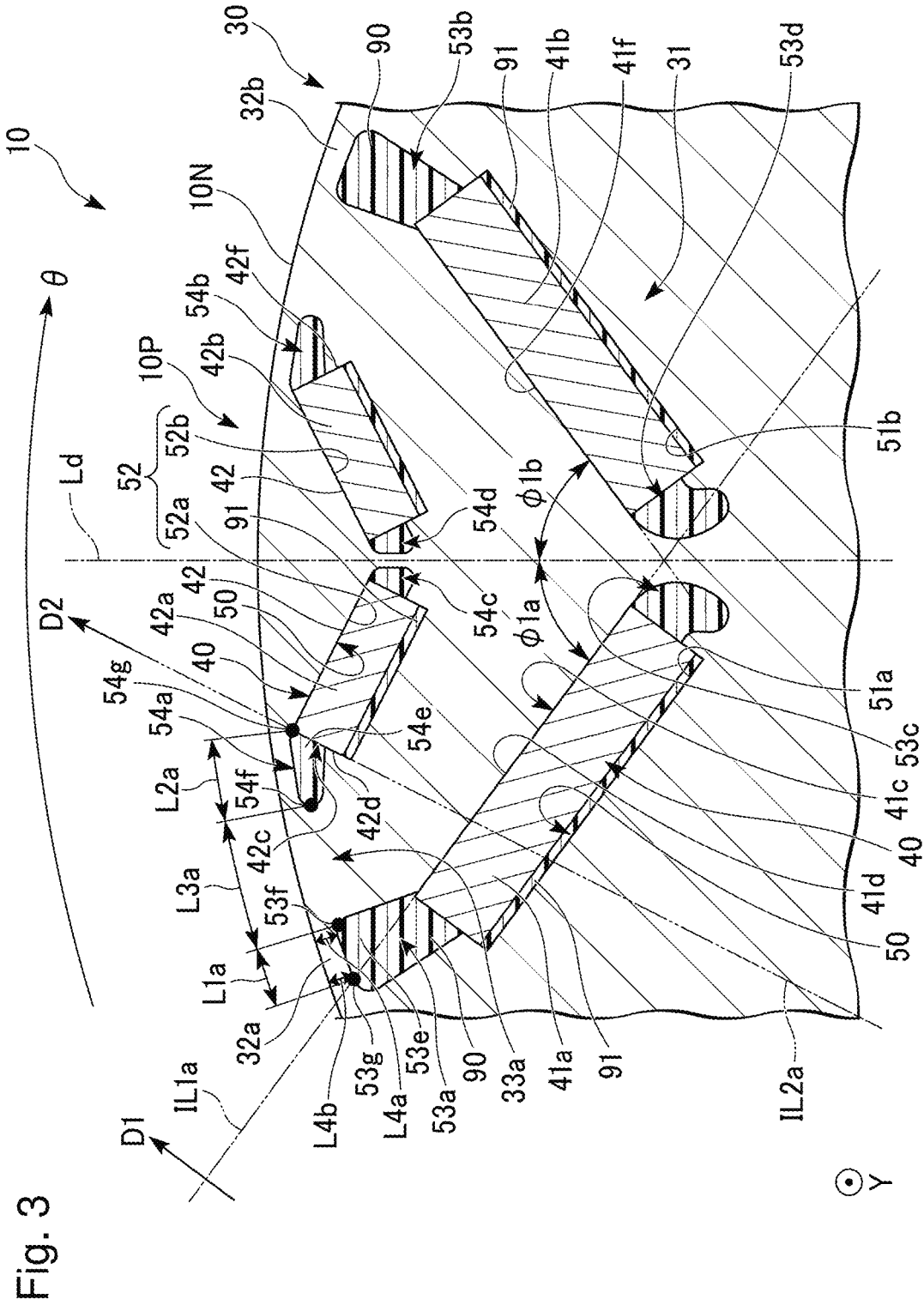
FIG. 3 is a cross-sectional view illustrating one magnetic pole of the rotor of the first embodiment.

The plurality of magnet holes 50 penetrates the rotor core 30 in the axial direction. As illustrated in FIG. 3, in each magnet holding portion 31, the plurality of magnet holes 50 include a pair of first magnet holes 51a and 51b adjacent to each other in the circumferential direction and a second magnet hole 52 different from the pair of first magnet holes 51a and 51b. In each magnet holding portion 31 of the present embodiment, the second magnet hole 52 includes a pair of second magnet holes 52a and 52b adjacent in the circumferential direction. That is, in each magnet holding portion 31, the plurality of magnet holes 50 include the pair of second magnet holes 52a and 52b. In the present embodiment, each magnet holding portion 31 is provided with a total of four magnet holes 50 including a pair of first magnet holes 51a and 51b and a pair of second magnet holes 52a and 52b.

One magnet 40 is disposed in each of the plurality of magnet holes 50. The type of the magnet 40 is not particularly limited. The magnet 40 may be, for example, a neodymium magnet or a ferrite magnet. The magnet 40 has, for example, a rectangular parallelepiped shape elongated in the axial direction. The magnet 40 extends, for example, from one axial end portion to the other axial end portion of the rotor core 30. In the present embodiment, the magnet 40 has a rectangular shape when viewed in the axial direction.

The plurality of magnets 40 are respectively accommodated in a plurality of magnet holes 50 provided in the rotor core 30. The plurality of magnets 40 include a pair of first magnets 41a and 41b adjacent in the circumferential direction, and a second magnet 42 located on the radially outer side of the pair of first magnets 41a and 41b. The pair of first magnets 41a and 41b are disposed in the pair of first magnet holes 51a and 51b, respectively. In the present embodiment, the second magnet 42 includes a pair of second magnets 42a and 42b adjacent in the circumferential direction. The pair of second magnets 42a and 42b are disposed in the pair of second magnet holes 52a and 52b, respectively.

A resin 91 is disposed in a portion other than the portion where the magnet 40 is disposed in each magnet hole 50. In the present embodiment, each magnet 40 is fixed in each magnet hole 50 by the resin 91. A method of fixing each magnet 40 to each magnet hole 50 is not particularly limited. For example, each magnet 40 may be fixed to each magnet hole 50 by caulking a part of the rotor core 30.

As illustrated in FIG. 2, one magnet holding portion 31 and the plurality of magnets 40 disposed in the plurality of magnet holes 50 provided in one magnet holding portion 31 constitute a magnetic pole 10P. That is, the rotor 10 of the present embodiment is provided with a plurality of magnetic poles 10P having a pair of first magnets 41a and 41b, at least one or more second magnets 42, and a part of the rotor core 30 along the circumferential direction. The plurality of magnetic poles 10P are provided at equal intervals over the entire circumference along the circumferential direction. In the present embodiment, eight magnetic poles 10P are provided. The plurality of magnetic poles 10P include a plurality of magnetic poles 10N in which the magnetic pole on the outer peripheral surface of the rotor core 30 is an N pole and a plurality of magnetic poles 10S in which the magnetic pole on the outer peripheral surface of the rotor core 30 is an S pole. In the present embodiment, four magnetic poles 10N and four magnetic poles 10S are provided. The four magnetic poles 10N and the four magnetic poles 10S are alternately disposed along the circumferential direction.

Figure 4:
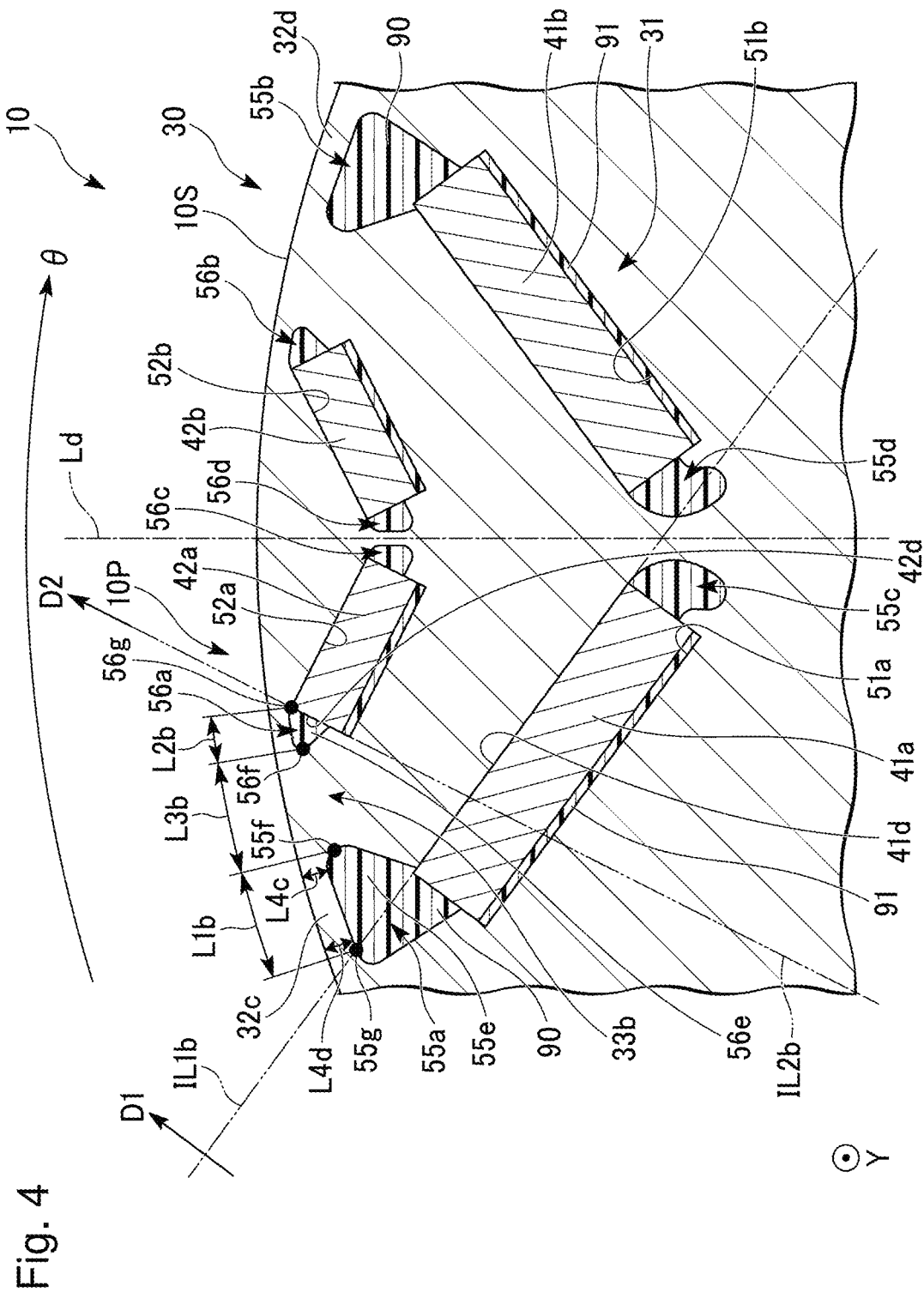
FIG. 4 is a cross-sectional view illustrating another magnetic pole of the rotor of the first embodiment.

As illustrated in FIGS. 3 and 4, in each magnetic pole 10P, the first magnet hole 51a and the first magnet hole 51b are disposed with a magnetic pole center line Ld interposed therebetween in the circumferential direction. The magnetic pole center line Ld is an imaginary line passing through the circumferential center of the magnetic pole 10P and the central axis J and extending in the radial direction. The magnetic pole center line Ld is provided for each magnetic pole 10P. The magnetic pole center line Ld passes through on a d axis of the rotor 10 when viewed in the axial direction. The direction where the magnetic pole center line Ld extends is the d-axis direction of the rotor 10. The first magnet hole 51a and the first magnet hole 51b are disposed line-symmetrically with respect to the magnetic pole center line Ld when viewed in the axial direction.

The pair of first magnet holes 51a and 51b extend in directions away from each other in the circumferential direction toward the radially outer side from the radially inner side when viewed in the axial direction. That is, the circumferential distance between the first magnet hole 51a and the first magnet hole 51b increases toward the radially outer side from the radially inner side. The pair of first magnet holes 51a and 51b are disposed along a V shape expanding in the circumferential direction toward the radially outer side when viewed in the axial direction.

The pair of first magnets 41a and 41b respectively disposed in the pair of first magnet holes 51a and 51b are disposed along a V shape expanding in the circumferential direction toward the radially outer side when viewed in the axial direction. That is, the pair of first magnets 41a and 41b extends in directions away from each other in the circumferential direction from the radially inner side to the radially outer side when viewed in the axial direction. The pair of first magnets 41a and 41b is disposed so as to sandwich the magnetic pole center line Ld, that is, the circumferential center of the magnetic pole 10P in the circumferential direction. The first magnet 41a and the first magnet 41b are disposed line-symmetrically with respect to the magnetic pole center line Ld when viewed in the axial direction. Therefore, in the following description, the description of the first magnet 41b may be omitted for the same configuration except that the configuration is line-symmetric with respect to the magnetic pole center line Ld.

An edge 41c of the first magnet 41a located on the radially outer side in a first orthogonal direction D1 orthogonal to the direction in which the first magnet 41a extends when viewed in the axial direction has a linear portion 41d extending in the direction in which the first magnet 41a extends when viewed in the axial direction. In FIGS. 3 and 4, the first orthogonal direction D1 is indicated by an arrow D1. The side on which the arrow D1 faces (+D1 side) corresponds to the radially outer side in the first orthogonal direction D1. In the present embodiment, since the first magnet 41a has a rectangular shape when viewed in the axial direction, the entire edge 41c is a linear portion 41d.

The linear portion 41d is in contact with a surface located on the radially outer side in the first orthogonal direction D1 of the inner surface of the first magnet hole 51a. The surface of the inner surface of the first magnet hole 51a located on the radially inner side in the first orthogonal direction D1 and the first magnet 41a are disposed apart from each other in the first orthogonal direction D1. The radially inner side in the first orthogonal direction D1 is the side opposite to the side on which the arrow D1 faces (−D1 side). A space between a surface of the inner surface of the first magnet hole 51a located on the radially inner side in the first orthogonal direction D1 and the first magnet 41a is filled with the resin 91. Like the first magnet 41a, the first magnet 41b has a linear portion 41f.

FIG. 3 illustrates a first imaginary line IL1a overlapping the linear portion 41d in the magnetic pole 10N when viewed in the axial direction. FIG. 4 illustrates a first imaginary line IL1b overlapping the linear portion 41d in the magnetic pole 10S when viewed in the axial direction. The first imaginary lines IL1a and IL1b extend in a direction in which the linear portion 41d extends when viewed in the axial direction. The first imaginary lines IL1a and IL1b extend in a direction parallel to the direction in which the first magnet 41a extends when viewed in the axial direction.

As illustrated in FIG. 3, when viewed in the axial direction, the absolute values of angles $\phi 1a$ and $\phi 1b$ in the direction in which the pair of first magnets 41a and 41b extends with respect to the circumferential center of the magnetic pole 10P, that is, the radial direction passing through the magnetic pole center line Ld are the same. Therefore, the flow of the magnetic flux passing through the pair of first magnets 41a and 41b can be easily made symmetrical with respect to the circumferential center of the magnetic pole 10P, and the rotational torque can be suitably generated with respect to the rotor 10. In FIG. 3, the angle $\phi 1a$ is a smaller angle of the angles formed by the first imaginary line IL1a and the magnetic pole center line Ld. In FIG. 3, the angle $\phi 1b$ is a smaller angle of angles formed by an extension line obtained by extending the linear portion 41f to a position intersecting the magnetic pole center line Ld and the magnetic pole center line Ld. The angles $\phi 1a$ and $\phi 1b$ are, for example, 40° or more and 65° or less. The opening angle of the pair of first magnets 41a and 41b disposed along the V shape when viewed in the axial direction is, for example, 80° or more and 130° or less. The opening angle of the pair of first magnets 41a and 41b disposed along the V shape when viewed in the axial direction is an angle obtained by adding the angle $\phi 1a$ and the angle $\phi 1b$.

In the present description, when the magnet has a rectangular shape when viewed in the axial direction as in the first magnets 41a and 41b of the present embodiment, for example, the "direction where the magnet extends when viewed in the axial direction" is a direction where the long side of the rectangular magnet extends. That is, for example, in the present embodiment, the "direction where the first magnet 41a extends when viewed in the axial direction" is a direction where the long side of the rectangular first magnet 41a extends when viewed in the axial direction.

The pair of second magnet holes 52a and 52b are positioned on the radially outer side of the pair of first magnet holes 51a and 51b. The second magnet hole 52a is positioned on the radially outer side of the first magnet hole 51a. The second magnet hole 52b is positioned on the radially outer side of the first magnet hole 51b. In the magnetic pole 10P, the second magnet hole 52a and the second magnet hole 52b are disposed with the magnetic pole center line Ld interposed therebetween in the circumferential direction. The second magnet hole 52a and the second magnet hole 52b are disposed line-symmetrically with respect to the magnetic pole center line Ld when viewed in the axial direction.

The pair of second magnet holes 52a and 52b extend in directions away from each other in the circumferential direction toward the radially outer side from the radially inner side when viewed in the axial direction. That is, the circumferential distance between the second magnet hole 52a and the second magnet hole 52b increases toward the radially outer side from the radially inner side. The pair of second magnet holes 52a and 52b are disposed along a V shape expanding in the circumferential direction toward the radially outer side when viewed in the axial direction.

The pair of second magnets 42a and 42b respectively disposed in the pair of second magnet holes 52a and 52b are disposed along a V shape expanding in the circumferential direction toward the radially outer side when viewed in the axial direction. That is, the pair of second magnets 42a and 42b extend in directions away from each other in the circumferential direction toward the radially outer side from the radially inner side when viewed in the axial direction. The pair of second magnets 42a and 42b is disposed so as to sandwich the magnetic pole center line Ld, that is, the circumferential center of the magnetic pole 10P in the circumferential direction.

Similarly to the pair of first magnets 41a and 41b, the absolute values of the angles in the direction in which the pair of second magnets 42a and 42b extends with respect to the radial direction passing through the circumferential center of the magnetic pole 10P when viewed in the axial direction are the same. In the present embodiment, the angle of the pair of second magnets 42a and 42b is an angle defined similarly to the angles $\phi 1a$ and $\phi 1b$ of the pair of first magnets 41a and 41b described above. That is, the angle of the pair of second magnets 42a and 42b is the inclination angle of the long side on the radially outer side with respect to the magnetic pole center line Ld in each of the second magnets 42a and 42b having a rectangular shape when viewed in the axial direction. The angle of each of the pair of second magnets 42a and 42b is, for example, 40° or more and 80° or less. The angle of the pair of second magnets 42a and 42b may be the same as or different from the angles $\phi 1a$ and $\phi 1b$ of the pair of first magnets 41a and 41b. In the present embodiment, the angle of the pair of second magnets 42a and 42b is larger than the angles $\phi 1a$ and $\phi 1b$. The opening angle of the pair of second magnets 42a and 42b disposed along the V shape when viewed in the axial direction is, for example, 80° or more and 160° or less. In the present embodiment, the opening angle of the pair of second magnets 42a and 42b disposed along the V shape when viewed in the axial direction is larger than the opening angle of the pair of first magnets 41a and 41b disposed along the V shape when viewed in the axial direction.

The second magnet 42a and the second magnet 42b are disposed line-symmetrically with respect to the magnetic pole center line Ld when viewed in the axial direction. Therefore, in the following description, the description of the second magnet 42b may be omitted for the same configuration except that the configuration is line-symmetric with respect to the magnetic pole center line Ld.

An edge 42c of the second magnet 42a located on the radially outer side in the direction in which the second magnet 42a extends when viewed in the axial direction has a linear portion 42d extending in a second orthogonal direction D2 orthogonal to the direction in which the second magnet 42a extends when viewed in the axial direction. In FIGS. 3 and 4, the second orthogonal direction D2 is indicated by an arrow D2. The second orthogonal direction D2 is a direction having a smaller inclination with respect to the radial direction than the first orthogonal direction D1. In the present embodiment, since the second magnet 42a has a rectangular shape when viewed in the axial direction, the entire edge 42c is the linear portion 42d. Similarly to the second magnet 42a, the second magnet 42b has a linear portion 42f.

The surface of the second magnet 42a located on the radially outer side in the second orthogonal direction D2 is in contact with the surface of the inner surface of the second magnet hole 52a located on the radially outer side in the second orthogonal direction D2. The surface of the inner surface of the second magnet hole 52a located on the radially inner side in the second orthogonal direction D2 and the second magnet 42a are disposed apart from each other in the second orthogonal direction D2. The radially outer side in the second orthogonal direction D2 is a side on which the arrow D2 faces (+D2 side). The radially inner side in the second orthogonal direction D2 is a side opposite to the side on which the arrow D2 faces (−D2 side). A space between a surface of the inner surface of the second magnet hole 52a located on the radially inner side in the second orthogonal direction D2 and the second magnet 42a is filled with the resin 91.

FIG. 3 illustrates a second imaginary line IL2a overlapping the linear portion 42d in the magnetic pole 10N when viewed in the axial direction. FIG. 4 illustrates a second imaginary line IL2b overlapping the linear portion 42d in the magnetic pole 10S when viewed in the axial direction. The second imaginary lines IL2a and IL2b extend in the direction in which the linear portion 42d extends. The second imaginary lines IL2a and IL2b extend in the second orthogonal direction D2 orthogonal to the direction in which the second magnet 42a extends when viewed in the axial direction. As illustrated in FIG. 3, the second imaginary line IL2a is an imaginary line passing through an end portion of the second magnet 42a of the magnetic pole 10N on a side where a second flux barrier portion 54a described later is provided in the direction in which the second magnet 42a extends, that is, the linear portion 42d when viewed in the axial direction. As illustrated in FIG. 4, the second imaginary line IL2b is an imaginary line passing through an end portion of the second magnet 42a of the magnetic pole 10S on a side where a second flux barrier portion 56a described later is provided in the direction in which the second magnet 42a extends, that is, the linear portion 42d when viewed in the axial direction.

As described above, in each magnetic pole 10P of the present embodiment, two pairs of magnets 40 disposed along a V shape when viewed in the axial direction are provided side by side in the radial direction. By providing the four magnets 40 in each magnetic pole 10P in such an arrangement, it is possible to suitably flow a magnetic flux between the rotor 10 and the stator 61. Thus, the output of the rotary electric machine 60 can be suitably obtained.

As illustrated in FIG. 3, magnetic pole 10N includes a pair of first flux barrier portions 53a and 53b, a pair of second flux barrier portions 54a and 54b, a pair of third flux barrier portions 53c and 53d, and a pair of fourth flux barrier portions 54c and 54d. In the present embodiment, each of the flux barrier portions is configured by filling a hole axially penetrating the rotor core 30 with a resin 90.

In the present description, the "flux barrier portion" is a portion that can suppress the flow of magnetic flux. That is, the magnetic flux hardly passes through each flux barrier portion. Each flux barrier portion is not particularly limited as long as it can suppress the flow of magnetic flux, and it may include a void and may include a non-magnetic portion other than the resin.

The pair of first flux barrier portions 53a and 53b is provided on the radially outer side of each of the first magnets 41a and 41b along the direction in which each of the first magnets 41a and 41b extends when viewed in the axial direction. The first flux barrier portion 53a is provided on the radially outer side of the first magnet 41a along the direction in which the first magnet 41a extends when viewed in the axial direction. The hole of the rotor core 30 provided in the first flux barrier portion 53a is connected to the first magnet hole 51a. The first flux barrier portion 53b is provided on the radially outer side of the first magnet 41b along the direction in which the first magnet 41b extends when viewed in the axial direction. The hole of the rotor core 30 provided in the first flux barrier portion 53b is connected to the first magnet hole 51b.

The radially outer end portions of the pair of first flux barrier portions 53a and 53b are located at the radially outer peripheral edge of the rotor core 30. The radially outer edges of the pair of first flux barrier portions 53a and 53b are spaced on the radially inner side from the outer peripheral surface of the rotor core 30. That is, in the present embodiment, the first flux barrier portions 53a and 53b are provided apart on the radially inner side from the radially outer surface of the rotor core 30.

The pair of first flux barrier portions 53a and 53b is disposed so as to sandwich the pair of second flux barrier portions 54a and 54b in the circumferential direction. The first flux barrier portion 53a is disposed adjacent to the second flux barrier portion 54a in the circumferential direction with a part of the rotor core 30 interposed therebetween. The first flux barrier portion 53b is disposed adjacent to the second flux barrier portion 54b in the circumferential direction with a part of the rotor core 30 interposed therebetween. The first flux barrier portion 53a and the first flux barrier portion 53b are disposed line-symmetrically with respect to the magnetic pole center line Ld when viewed in the axial direction. Therefore, in the following description, the description of the first flux barrier portion 53b may be omitted for the same configuration except that the configuration is line-symmetric with respect to the magnetic pole center line Ld.

When viewed in the axial direction, the first imaginary line IL1a overlaps a part of the first flux barrier portion 53a. The first imaginary line IL1a is provided at a position dividing the first flux barrier portion 53a into two in the first orthogonal direction D1 orthogonal to the direction in which the first magnet 41a extends when viewed in the axial direction. The first flux barrier portion 53a has a first protruding portion 53e protruding in the first orthogonal direction D1 when viewed in the axial direction. The first protruding portion 53e is a portion of the first flux barrier portion 53a protruding on the radially outer side (+D1 side) in the first orthogonal direction D1 from the first imaginary line IL1a. The first protruding portion 53e protrudes toward the second flux barrier portion 54a adjacent in the circumferential direction in the first orthogonal direction D1. In the present embodiment, the first protruding portion 53e protrudes closer to the second flux barrier portion 54a adjacent to the first imaginary line IL1a in the circumferential direction when viewed in the axial direction. In the present embodiment, the first protruding portion 53e has a substantially triangular shape with a portion overlapping the first imaginary line IL1a as one side when viewed in the axial direction.

The first flux barrier portion 53a has a first end portion 53f. The first end portion 53f is an end portion on a side (+θ side) close to the second flux barrier portion 54a adjacent in the circumferential direction. In the present embodiment, the first end portion 53f is an end portion of the radially outer end portion of the first flux barrier portion 53a on a side close to the second flux barrier portion 54a in the circumferential direction. The first flux barrier portion 53a has a third end portion 53g. The third end portion 53g is a radially outer end portion of a portion of the first flux barrier portion 53a overlapping the first imaginary line IL1a when viewed in the axial direction. The third end portion 53g is a part of the radially outer end portion of the first flux barrier portion 53a. The third end portion 53g is provided on the side (−θ side) farther from the second flux barrier portion 54a in the circumferential direction than the first end portion 53f, that is, on the side farther from the magnetic pole center line Ld in the circumferential direction than the first end portion 53f.

The pair of second flux barrier portions 54a and 54b is provided adjacent to the second magnet 42 between the pair of first flux barrier portions 53a and 53b in the circumferential direction. The second flux barrier portion 54a is provided adjacent to the second magnet 42a. The second flux barrier portion 54b is provided adjacent to the second magnet 42b. The pair of second flux barrier portions 54a and 54b is disposed adjacent to the pair of first flux barrier portions 53a and 53b at intervals in the circumferential direction.

The pair of second flux barrier portions 54a and 54b is provided on the radially outer side of each of the second magnets 42a and 42b along the direction in which each of the second magnets 42a and 42b extends when viewed in the axial direction. The second flux barrier portion 54a is provided on the radially outer side of the second magnet 42a along the direction in which the second magnet 42a extends when viewed in the axial direction. The hole of the rotor core 30 provided in the second flux barrier portion 54a is connected to the second magnet hole 52a. The second flux barrier portion 54b is provided on the radially outer side of the second magnet 42b along the direction in which the second magnet 42b extends when viewed in the axial direction. The hole of the rotor core 30 provided in the second flux barrier portion 54b is connected to the second magnet hole 52b.

The radially outer end portions of the pair of second flux barrier portions 54a and 54b are located at the radially outer peripheral edge of the rotor core 30. The radially outer edges of the pair of second flux barrier portions 54a and 54b are spaced on the radially inner side from the outer peripheral surface of the rotor core 30. That is, in the present embodiment, the second flux barrier portions 54a and 54b are provided apart on the radially inner side from the radially outer surface of the rotor core 30.

The second flux barrier portion 54a and the second flux barrier portion 54b are disposed line-symmetrically with respect to the magnetic pole center line Ld when viewed in the axial direction. Therefore, in the following description, the description of the second flux barrier portion 54b may be omitted for the same configuration except that the configuration is line-symmetric with respect to the magnetic pole center line Ld.

When viewed in the axial direction, the second imaginary line IL2a overlaps a part of the second flux barrier portion 54a. In the present embodiment, when viewed in the axial direction, an edge connected to the second magnet 42a in the outer edge of the second flux barrier portion 54a overlaps the second imaginary line IL2a. The second flux barrier portion 54a has a second protruding portion 54e protruding toward the first flux barrier portion 53a adjacent in the circumferential direction. In the present embodiment, the second flux barrier portion 54a includes the second protruding portion 54e. The second protruding portion 54e protrudes to a side (−θ side) closer to the first flux barrier portion 53a adjacent in the circumferential direction than the second imaginary line IL2a.

The second flux barrier portion 54a has a second end portion 54f. The second end portion 54f is an end portion on a side (−θ side) close to the first flux barrier portion 53a adjacent in the circumferential direction. In the present embodiment, the second end portion 54f is an end portion of the radially outer end portion of the second flux barrier portion 54a on a side close to the first flux barrier portion 53a in the circumferential direction. The second flux barrier portion 54a has a fourth end portion 54g. The fourth end portion 54g is a radially outer end portion of a portion of the second flux barrier portion 54a overlapping the second imaginary line IL2a when viewed in the axial direction. In the present embodiment, the fourth end portion 54g is an end portion of the radially outer end portion of the second flux barrier portion 54a on the side (+θ side) farther from the first flux barrier portion 53a in the circumferential direction. The fourth end portion 54g is connected to a corner located on the radially outermost side among corners of the second magnet 42a having a rectangular shape when viewed in the axial direction. The fourth end portion 54g is provided on the side (+θ side) farther from the first flux barrier portion 53a in the circumferential direction than the second end portion 54f, that is, on the side closer to the magnetic pole center line Ld in the circumferential direction than the second end portion 54f.

The pair of third flux barrier portions 53c and 53d is provided on the radially inner side of each of the first magnets 41a and 41b along the direction in which each of the first magnets 41a and 41b extends when viewed in the axial direction. The holes of the rotor core 30 provided in the pair of third flux barrier portions 53c and 53d are connected to the pair of first magnet holes 51a and 51b, respectively. The third flux barrier portion 53c and the third flux barrier portion 53d are disposed adjacent at an interval in the circumferential direction. The third flux barrier portion 53c and the third flux barrier portion 53d are disposed so as to sandwich the magnetic pole center line Ld in the circumferential direction. The third flux barrier portion 53c and the third flux barrier portion 53d are disposed line-symmetrically with respect to the magnetic pole center line Ld.

The pair of fourth flux barrier portions 54c and 54d is provided on the radially inner side of each of the second magnets 42a and 42b along the direction in which each of the second magnets 42a and 42b extends when viewed in the axial direction. The holes of the rotor core 30 provided in the pair of fourth flux barrier portions 54c and 54d are connected to the pair of second magnet holes 52a and 52b, respectively. The fourth flux barrier portion 54c and the fourth flux barrier portion 54d are disposed adjacent at an interval in the circumferential direction. The fourth flux barrier portion 54c and the fourth flux barrier portion 54d are disposed so as to sandwich the magnetic pole center line Ld in the circumferential direction. The fourth flux barrier portion 54c and the fourth flux barrier portion 54d are disposed line-symmetrically with respect to the magnetic pole center line Ld.

As illustrated in FIG. 4, the magnetic pole 10S includes a pair of first flux barrier portions 55a and 55b, a pair of second flux barrier portions 56a and 56b, a pair of third flux barrier portions 55c and 55d, and a pair of fourth flux barrier portions 56c and 56d. In the present embodiment, each of the flux barrier portions is configured by filling a hole axially penetrating the rotor core 30 with a resin 90.

The first flux barrier portion 55a has a first protruding portion 55e protruding in the first orthogonal direction D1. The dimension of the first protruding portion 55e in the first orthogonal direction D1 is larger than the dimension of the first protruding portion 53e in the first orthogonal direction D1 in the magnetic pole 10N. The other configuration of the first protruding portion 55e is similar to the other configuration of the first protruding portion 53e.

The first flux barrier portion 55a has a first end portion 55f. The first end portion 55f is different from the first end portion 53f of the magnetic pole 10N in the relative position in the circumferential direction with respect to the magnetic pole center line Ld. That is, the relative positions in the circumferential direction of the first end portions 53f and 55f with respect to the circumferential center of the magnetic pole 10P are different between the magnetic poles 10N and 10S adjacent in the circumferential direction. The first end portion 55f is provided at a position closer to the magnetic pole center line Ld than the first end portion 53f. That is, the relative position of the first end portion 55f of the magnetic pole 10S in the circumferential direction with respect to the magnetic pole center line Ld is a position closer to the circumferential center of the magnetic pole 10P than the relative position of the first end portion 53f of the magnetic pole 10N in the circumferential direction with respect to the magnetic pole centerline Ld. Other configurations of the first end portion 55f are similar to other configurations of the first end portion 53f.

The first flux barrier portion 55a has a third end portion 55g. The third end portion 55g is similar to the third end portion 53g of the first flux barrier portion 53a. The third end portion 55g has the same relative position in the circumferential direction with respect to the magnetic pole center line Ld as the third end portion 53g of the magnetic pole 10N.

The second flux barrier portion 56a has a second protruding portion 56e. The circumferential dimension of the second protruding portion 56e is smaller than the circumferential dimension of the second protruding portion 54e in the magnetic pole 10N. Other configurations of the second protruding portion 56e are similar to other configurations of the second protruding portion 54e.

The second flux barrier portion 56a has a second end portion 56f. The second end portion 56f is different from the second end portion 54f of the magnetic pole 10N in the relative position in the circumferential direction with respect to the magnetic pole center line Ld. That is, the relative positions in the circumferential direction of the second end portions 54f and 56f with respect to the circumferential center of the magnetic pole 10P are different between the magnetic poles 10N and 10S adjacent in the circumferential direction. The second end portion 56f is provided at a position closer to the magnetic pole center line Ld than the second end portion 54f. That is, the relative position of the second end portion 56f of the magnetic pole 10S in the circumferential direction with respect to the magnetic pole center line Ld is a position closer to the circumferential center of the magnetic pole 10P than the relative position of the second end portion 54f of the magnetic pole 10N in the circumferential direction with respect to the magnetic pole center line Ld. The other configurations of the second end portion 56f are similar to the other configurations of the second end portion 54f.

The second flux barrier portion 56a has a fourth end portion 56g. The fourth end portion 56g is similar to the fourth end portion 54g of the second flux barrier portion 54a. The relative position of the fourth end portion 56g in the circumferential direction with respect to the magnetic pole center line Ld is the same as that of the fourth end portion 56g of the magnetic pole 10N.

The other configurations of the pair of first flux barrier portions 55a and 55b are similar to the other configurations of the pair of first flux barrier portions 53a and 53b. The other configurations of the pair of second flux barrier portions 56a and 56b are similar to the other configurations of the pair of second flux barrier portions 54a and 54b. The pair of third flux barrier portions 55c and 55d is similar to the pair of third flux barrier portions 53c and 53d. The pair of fourth flux barrier portions 56c and 56d is similar to the pair of fourth flux barrier portions 54c and 54d.

As illustrated in FIGS. 3 and 4, a first dimension L1a in the circumferential direction in the portion between the third end portion 53g and the first end portion 53f of the magnetic pole 10N is different from a first dimension L1b in the circumferential direction in the portion between the third end portion 55g and the first end portion 55f of the magnetic pole 10S. That is, the first dimensions L1a and L1b are different from each other in the magnetic poles 10N and 10S adjacent in the circumferential direction. The first dimension Lib is larger than the first dimension L1a. The first dimension L1a is less than half of the distance between the third end portion 53g and the fourth end portion 54g in the circumferential direction. The first dimension Lib is less than half of the distance between the third end portion 55g and the fourth end portion 56g in the circumferential direction. A distance between the third end portion 53g and the fourth end portion 54g in the circumferential direction and a distance between the third end portion 55g and the fourth end portion 56g in the circumferential direction are the same.

A second dimension L2a in the circumferential direction in the portion between the fourth end portion 54g and the second end portion 54f of the magnetic pole 10N is different from a second dimension L2b in the circumferential direction in the portion between the fourth end portion 56g and the second end portion 56f of the magnetic pole 10S. That is, the second dimensions L2a and L2b are different from each other in the magnetic poles 10N and 10S adjacent in the circumferential direction. The second dimension L2b is smaller than the second dimension L2a. The second dimension L2a is less than half of the distance between the third end portion 53g and the fourth end portion 54g in the circumferential direction. The second dimension L2b is less than half of the distance between the third end portion 55g and the fourth end portion 56g in the circumferential direction.

A ratio of a circumferential distance L3b between the first end portion 55f and the second end portion 56f in the magnetic pole 10S to a circumferential distance L3a between the first end portion 53f and the second end portion 54f in the magnetic pole 10N is 0.9 or more and 1.1 or less. In the present embodiment, the circumferential distance L3a and the circumferential distance L3b are the same. The circumferential distance L3a is a circumferential dimension of a narrow portion 33a located between the first end portion 53f and the second end portion 54f of the rotor core 30 in the circumferential direction. The circumferential distance L3b is a circumferential dimension of a narrow portion 33b located between the first end portion 55f and the second end portion 56f of the rotor core 30 in the circumferential direction.

As illustrated in FIG. 3, the rotor core 30 has interposition portions 32a and 32b. The interposition portion 32a is a portion of the rotor core 30 located between the first flux barrier portion 53a and the radially outer surface of the rotor core 30. The interposition portion 32a extends in the circumferential direction. The radial minimum dimension L4a in the portion of the interposition portion 32a on the side (+θ side) close to the magnetic pole center line Ld of the magnetic pole 10N in the circumferential direction is equal to or less than the radial minimum dimension L4b in the portion of the interposition portion 32a on the side (−θ side) far from the magnetic pole center line Ld of the magnetic pole 10N in the circumferential direction. In the present embodiment, the minimum dimension L4a is smaller than the minimum dimension L4b. The radial dimension of the interposition portion 32a decreases toward the magnetic pole center line Ld in the circumferential direction except for both circumferential end portions of the interposition portion 32a. The minimum dimension L4a is the smallest radial dimension of the entire interposition portion 32a. The interposition portion 32b is similar to the interposition portion 32a except that the interposition portion 32b is disposed line-symmetrically with the interposition portion 32a with respect to the magnetic pole center line Ld.

As illustrated in FIG. 4, the rotor core 30 has interposition portions 32c and 32d. The interposition portion 32c is a portion of the rotor core 30 located between the first flux barrier portion 55a and the radially outer surface of the rotor core 30. The interposition portion 32c extends in the circumferential direction. A radial minimum dimension L4c in the portion of the interposition portion 32c on the side (+θ side) close to the magnetic pole center line Ld of the magnetic pole 10S in the circumferential direction is equal to or less than the radial minimum dimension L4d in the portion of the interposition portion 32c on the side (−θ side) far from the magnetic pole center line Ld of the magnetic pole 10S in the circumferential direction. In the present embodiment, the minimum dimension L4c is smaller than the minimum dimension L4d. The radial dimension of the interposition portion 32c decreases toward the magnetic pole center line Ld in the circumferential direction except for both circumferential end portions of the interposition portion 32c. The minimum dimension L4c is the smallest radial dimension of the entire interposition portion 32c. In the present embodiment, the minimum dimension L4c is the same as the minimum dimension L4a. That is, in the present embodiment, the radial minimum dimensions L4a and L4c of the interposition portions 32a and 32c are the same between the magnetic poles 10N and 10S adjacent in the circumferential direction. The interposition portion 32d is similar to the interposition portion 32c except that the interposition portion 32d is disposed line-symmetrically with the interposition portion 32c with respect to the magnetic pole center line Ld.

According to the present embodiment, the relative positions in the circumferential direction of the first end portions 53f and 55f with respect to the circumferential center of the magnetic pole 10P are different from each other between the magnetic poles 10P adjacent in the circumferential direction. The relative positions in the circumferential direction of the second end portions 54f and 56f with respect to the circumferential center of the magnetic pole 10P are different from each other in the magnetic pole 10P adjacent in the circumferential direction. Therefore, in the magnetic poles 10P adjacent in the circumferential direction, the circumferential positions of the narrow portions 33a and 33b of the rotor core 30 located between the first end portions 53f and 55f and the second end portions 54f and 56f in the circumferential direction can be made different from each other with respect to the circumferential center of the magnetic pole 10P. A magnetic flux flowing between the rotor 10 and the stator 61 passes through each of the narrow portions 33a and 33b. Therefore, when the circumferential positions of the narrow portions 33a and 33b are different from each other in the adjacent magnetic poles 10P, the phases of the cogging torques caused by the magnetic fluxes passing through the narrow portions 33a and 33b are different. As a result, the phase of the cogging torque generated due to the magnetic flux passing through the narrow portion 33a of the magnetic pole 10N and the phase of the cogging torque generated due to the magnetic flux passing through the narrow portion 33b of the magnetic pole 10S are shifted from each other, and at least a part of the cogging torques in the magnetic poles 10N and 10S can cancel each other. Therefore, the cogging torque generated in the rotor 10 can be reduced. In addition, since the cogging torque can be reduced by changing the positions of the narrow portions 33a and 33b in the circumferential direction, it is easy to manufacture the rotor 10 as compared with, for example, a case where the cogging torque is reduced by providing another flux barrier portion. In addition, since it is not necessary to form a hole in the rotor core 30 in order to provide the other flux barrier portion, it is possible to suppress a decrease in strength of the rotor core 30.

By adjusting the relative positions in the circumferential direction of the respective narrow portions 33a and 33b to positions where the phase of the cogging torque generated by the magnetic flux passing through the narrow portion 33a of the magnetic pole 10N and the phase of the cogging torque generated by the magnetic flux passing through the narrow portion 33b of the magnetic pole 10S are opposite phases to each other, the cogging torque generated in the rotor 10 can be more suitably reduced.

According to the present embodiment, the first flux barrier portions 53a and 55a have the first protruding portions 53e and 55e protruding in the first orthogonal direction D1 orthogonal to the direction in which the first magnets 41a adjacent to the first flux barrier portions 53a and 55a extend when viewed in the axial direction. The first protruding portions 53e and 55e protrude toward the second flux barrier portions 54a and 56a adjacent in the circumferential direction in the first orthogonal direction D1. Therefore, by making the protrusion height of the first protruding portion 53e of the magnetic pole 10N and the protrusion height of the first protruding portion 55e of the magnetic pole 10S different from each other, the circumferential position of the narrow portion 33a and the circumferential position of the narrow portion 33b can be easily made different from each other.

Further, according to the present embodiment, the first protruding portions 53e and 55e protrude closer to the second flux barrier portions 54a and 56a adjacent in the circumferential direction than the first imaginary lines IL1a and IL1b overlapping the linear portion 41d and extending in the direction in which the linear portion 41d extends when viewed in the axial direction. Therefore, by adjusting the protrusion heights of the first protruding portions 53e and 55e and the like, the circumferential positions of the narrow portions 33a and 33b can be made more suitable, and the circumferential dimensions of the narrow portions 33a and 33b can be made more suitable.

According to the present embodiment, the second flux barrier portions 54a and 56a have the second protruding portions 54e and 56e protruding toward the first flux barrier portions 53a and 55a adjacent in the circumferential direction. The second protruding portions 54e and 56e protrude closer to the first flux barrier portions 53a and 55a adjacent in the circumferential direction than the second imaginary lines IL2a and IL2b extending in the second orthogonal direction D2 orthogonal to the direction in which the second magnet 42a extends when viewed in the axial direction. The second imaginary lines IL2a and IL2b pass through the end portions of the second magnet 42a on the side where the second flux barrier portions 54a and 56a are provided in the direction in which the second magnet 42a extends when viewed in the axial direction. Therefore, by adjusting the protrusion heights of the second protruding portions 54e and 56e and the like, the circumferential positions of the narrow portions 33a and 33b can be made more suitable, and the circumferential dimensions of the narrow portions 33a and 33b can be made more suitable.

Further, according to the present embodiment, the first dimensions L1a and L1b in the circumferential direction in the portion between the third end portions 53g and 55g on the radially outer side and the first end portions 53f and 55f in the portion overlapping the first imaginary lines IL1a and IL1b when viewed in the axial direction among the first flux barrier portions 53a and 55a are different from each other in the magnetic poles 10P adjacent in the circumferential direction. The second dimensions L2a and L2b in the circumferential direction in the portion between the fourth end portions 54g and 56g and the second end portions 54f and 56f in the radially outer side in the portion overlapping the second imaginary lines IL2a and IL2b when viewed in the axial direction in the second flux barrier portions 54a and 56a are different from each other in the magnetic poles 10P adjacent in the circumferential direction. Therefore, in the magnetic poles 10P adjacent in the circumferential direction, the circumferential positions of the narrow portions 33a and 33b can be more easily and suitably made different.

According to the present embodiment, the first dimensions L1a and L1b and the second dimensions L2a and L2b are less than half of the circumferential distance between the third end portions 53g and 55g and the fourth end portions 54g and 56g. Therefore, the narrow portions 33a and 33b can be suitably provided between the first flux barrier portions 53a and 55a and the second flux barrier portions 54a and 56a in the circumferential direction. Further, it is possible to prevent the circumferential positions of the narrow portions 33a and 33b from being excessively biased to one side in the circumferential direction.

According to the present embodiment, the rotor core 30 has the interposition portions 32a and 32c located between the first flux barrier portions 53a and 55a and the radially outer surface of the rotor core 30. The radial minimum dimensions L4a and L4c of the interposition portions 32a and 32c are the same between the magnetic poles 10P adjacent in the circumferential direction. Therefore, the amount of magnetic flux leaking through the interposition portions 32a and 32b in each magnetic pole 10P can be made the same. As a result, the magnitude of the cogging torque generated in each magnetic pole 10P can be easily made the same. Therefore, by shifting the phases of the cogging torques generated in the magnetic poles 10P adjacent in the circumferential direction from each other, the cogging torques generated in the magnetic poles 10P adjacent in the circumferential direction can be suitably and easily canceled. Therefore, the cogging torque generated in the rotor 10 can be more suitably reduced.

In addition, according to the present embodiment, the radial minimum dimensions L4$a$ and L4$c$ in the portions of the interposition portions 32$a$ and 32$b$ on the side closer to the circumferential center of the magnetic pole 10P in the circumferential direction are equal to or smaller than the radial minimum dimensions L4$b$ and L4$d$ in the portions of the interposition portions 32$a$ and 32$b$ on the side farther from the circumferential center of the magnetic pole 10P in the circumferential direction. Therefore, the radial dimensions of the interposition portions 32$a$ and 32$b$ can be easily minimized at the position closer to the circumferential center of the magnetic pole 10P. As a result, the portion where the stress concentrates in the interposition portions 32$a$ and 32$b$ is likely to be a portion relatively close to the circumferential center of the magnetic pole 10P. That is, it is easy to relatively reduce the circumferential distance between the portion where the stress concentrates in the interposition portions 32$a$ and 32$b$ and the circumferential center of the magnetic pole 10P. As a result, it is easy to reduce the moment generated in the interposition portions 32$a$ and 32$b$. Therefore, it is possible to prevent the interposition portions 32$a$ and 32$b$ from being damaged by a centrifugal force or the like generated in the rotor 10.

In addition, according to the present embodiment, the relative position in the circumferential direction of the first end portion 55$f$ in one magnetic pole 10S of the magnetic poles 10P adjacent in the circumferential direction is a position closer to the circumferential center of the magnetic pole 10P than the relative position in the circumferential direction of the first end portion 53$f$ in the other magnetic pole 10N of the magnetic poles 10P adjacent in the circumferential direction. The relative position in the circumferential direction of the second end portion 56$f$ in the one magnetic pole 10S is a position closer to the circumferential center of the magnetic pole 10P than the relative position in the circumferential direction of the second end portion 54$f$ in the other magnetic pole 10N. As described above, by disposing the first end portion 55$f$ and the second end portion 56$f$ of the magnetic pole 10S to be shifted to the same side in the circumferential direction with respect to the first end portion 53$f$ and the second end portion 54$f$ of the magnetic pole 10N, the circumferential dimension of the narrow portion 33$b$ of the magnetic pole 10S can be made the same as the circumferential dimension of the narrow portion 33$a$ of the magnetic pole 10N, and the relative position of the narrow portion 33$b$ in the circumferential direction can be made different from the relative position of the narrow portion 33$a$ in the circumferential direction. As a result, the amount of magnetic flux flowing through the narrow portion 33$a$ of the magnetic pole 10N and the amount of magnetic flux flowing through the narrow portion 33$b$ of the magnetic pole 10S can be easily made the same, and the cogging torques generated in the magnetic poles 10N and 10S adjacent in the circumferential direction can be more suitably canceled out. Therefore, the cogging torque generated in the rotor 10 can be more suitably reduced.

According to the present embodiment, the ratio of the circumferential distance L3$a$ between the first end portion 53$f$ and the second end portion 54$f$ in the other magnetic pole 10N of the magnetic poles 10P adjacent in the circumferential direction to the circumferential distance L3$b$ between the first end portion 55$f$ and the second end portion 56$f$ in one magnetic pole 10S of the magnetic poles 10P adjacent in the circumferential direction is 0.9 or more and 1.1 or less.

Therefore, the circumferential dimension of the narrow portion 33$a$ in the magnetic pole 10N and the circumferential dimension of the narrow portion 33$b$ in the magnetic pole 10S can be easily made close to each other. As a result, the amount of magnetic flux flowing through the narrow portion 33$a$ of the magnetic pole 10N and the amount of magnetic flux flowing through the narrow portion 33$b$ of the magnetic pole 10S can be easily set to the same amount, and the cogging torques generated in the magnetic poles 10N and 10S adjacent in the circumferential direction can be more suitably canceled out. Therefore, the cogging torque generated in the rotor 10 can be more suitably reduced.

Further, according to the present embodiment, the circumferential distance L3$b$ between the first end portion 55$f$ and the second end portion 56$f$ in one magnetic pole 10S of the magnetic poles 10P adjacent in the circumferential direction and the circumferential distance L3$a$ between the first end portion 53$f$ and the second end portion 54$f$ in the other magnetic pole 10N are the same. That is, the circumferential dimension of the narrow portion 33$a$ in the magnetic pole 10N and the circumferential dimension of the narrow portion 33$b$ in the magnetic pole 10S are the same. Therefore, the amount of magnetic flux flowing through the narrow portion 33$a$ of the magnetic pole 10N and the amount of magnetic flux flowing through the narrow portion 33$b$ of the magnetic pole 10S can be made the same, and the cogging torques generated in the magnetic poles 10N and 10S adjacent in the circumferential direction can be more suitably canceled out. Therefore, the cogging torque generated in the rotor 10 can be more suitably reduced.

According to the present embodiment, in each magnetic pole 10P, a pair of second magnets 42 is provided adjacent in the circumferential direction. The pair of second magnets 42$a$ and 42$b$ extend in directions away from each other in the circumferential direction toward the radially outer side from the radially inner side when viewed in the axial direction. The pair of second flux barrier portions 54$a$ and 54$b$ and the pair of second flux barrier portions 56$a$ and 56$b$ are provided on the radially outer side of each of the second magnets 42$a$ and 42$b$ along the direction in which each of the second magnets 42$a$ and 42$b$ extends when viewed in the axial direction. Therefore, while the second flux barrier portions 54$a$, 54$b$, 56$a$, and 56$b$ are suitably disposed, the rotational torque can be suitably generated in each magnetic pole 10P by the magnetic force of the pair of second magnets 42$a$ and 42$b$.

Figure 5:
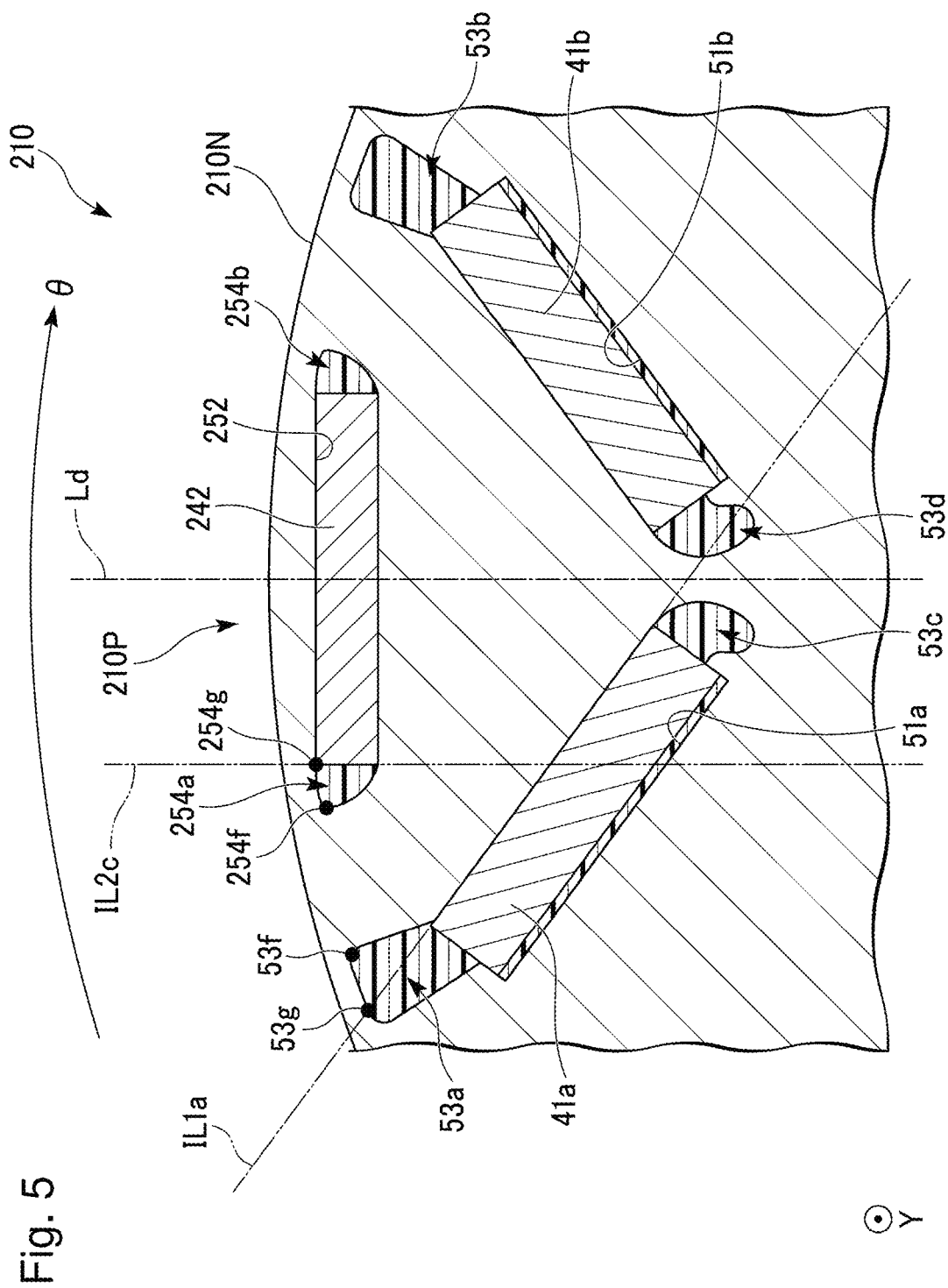
FIG. 5 is a cross-sectional view illustrating one magnetic pole of a rotor of a second embodiment.

Hereinafter, configurations similar to those of the above-described embodiment are denoted by the same reference numerals as appropriate, and the description thereof may be omitted. As illustrated in FIG. 5, a magnetic pole 210N of the rotor 210 of the present embodiment includes only one second magnet hole 252 and one second magnet 242 accommodated in the second magnet hole 252. The second magnet hole 252 and the second magnet 242 are located between the pair of first flux barrier portions 53$a$ and 53$b$ in the circumferential direction, and extend in a direction intersecting the circumferential center of the magnetic pole 210N, that is, the radial direction passing through the magnetic pole center line Ld when viewed in the axial direction. In the present embodiment, the second magnet hole 252 and the second magnet 242 extend in a direction orthogonal to the magnetic pole center line Ld when viewed in the axial direction.

In the present embodiment, the pair of first magnet holes 51$a$ and 51$b$ and the second magnet hole 252 are disposed along the V shape when viewed in the axial direction. The pair of first magnets 41$a$ and 41$b$ disposed in the pair of first magnet holes 51$a$ and 51$b$ and the second magnet 242 disposed in the second magnet hole 252 are disposed along the V shape when viewed in the axial direction. In the present embodiment, a second imaginary line IL2c extends in parallel with the magnetic pole center line Ld. The second imaginary line IL2c passes through the circumferential end portion of the second magnet 242 when viewed in the axial direction.

In the present embodiment, a pair of second flux barrier portions 254a and 254b is provided on both sides of the second magnet 242 in the circumferential direction. The second flux barrier portion 254a has a second end portion 254f and a fourth end portion 254g. The second end portion 254f is disposed in the same manner as the second end portion 54f of the first embodiment described above. The fourth end portion 254g is disposed in the same manner as the fourth end portion 54g of the first embodiment described above. The other configurations of the respective portions of the magnetic pole 210N are similar to the other configurations of the respective portions of the magnetic pole 10N of the first embodiment.

Although not illustrated, in the present embodiment, the magnetic pole adjacent to the magnetic pole 210N in the circumferential direction is different from the magnetic pole 10S of the first embodiment in that the magnetic pole 10N is different from the magnetic pole 210N. The other configurations of the portions of the magnetic pole adjacent to the magnetic pole 210N in the circumferential direction are similar to the other configurations of the portions of the magnetic pole 10S of the first embodiment. The other configurations of each part in the rotor 210 are similar to the other configurations of each part in the rotor 10 of the first embodiment. Also in the present embodiment, as described in the first embodiment, the cogging torque generated in the rotor 210 can be reduced.

According to the present embodiment, in each magnetic pole 210P, the second magnet 242 is located between the pair of first flux barrier portions 53a and 53b in the circumferential direction, and extends in the direction intersecting the radial direction passing through the circumferential center of the magnetic pole 210P when viewed in the axial direction. The pair of second flux barrier portions 254a and 254b is provided on both sides of the second magnet 242 in the circumferential direction. Therefore, it is easy to suitably dispose the pair of second flux barrier portions 254a and 254b while suitably obtaining the rotational torque generated in the rotor 210 by disposing the magnet along the V shape in each magnetic pole 210P.

The present invention is not limited to the above-described embodiment, and other structures and other methods may be employed within the scope of the technical idea of the present invention. The magnet provided in each magnetic pole is not particularly limited as long as the magnet includes the pair of first magnets and at least one or more second magnets. The second magnet may be disposed in any manner in each magnetic pole.

The shape of the first flux barrier portion and the shape of the second flux barrier portion are not particularly limited. The first flux barrier portion may not have the first protruding portion. The second flux barrier portion may not have the second protruding portion. As long as the relative position in the circumferential direction of the first end portion with respect to the circumferential center of the magnetic pole is different between the magnetic poles adjacent in the circumferential direction, each first end portion may be disposed at any position. As long as the relative position in the circumferential direction of the second end portion with respect to the circumferential center of the magnetic pole is different between the magnetic poles adjacent in the circumferential direction, each second end portion may be disposed at any position. The circumferential distance between the first end portion and the second end portion may be different between magnetic poles adjacent in the circumferential direction.

The rotary electric machine to which the present invention is applied is not limited to a motor, and may be a generator. The application of the rotary electric machine is not particularly limited. The rotary electric machine may be mounted in a device other than the vehicle. The application of the drive apparatus to which the present invention is applied is not particularly limited. For example, the drive apparatus may be mounted in a vehicle for a purpose other than the purpose of rotating the axle, or may be mounted on a device other than the vehicle. The posture when the rotary electric machine and the drive apparatus are used is not particularly limited. The central axis of the rotary electric machine may be inclined with respect to the horizontal direction orthogonal to the vertical direction or may extend in the vertical direction. The features described above in the present description may be appropriately combined as long as no conflict arises.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A rotor rotatable about a central axis, the rotor comprising:
    a rotor core; and
    a plurality of magnets respectively accommodated in a plurality of magnet holes provided in the rotor core,
    wherein the plurality of magnets include:
    a pair of first magnets adjacent in a circumferential direction; and
    a second magnet located on a radially outer side of the pair of first magnets,
    the pair of first magnets extends in directions away from each other in the circumferential direction from a radially inner side toward the radially outer side when viewed in an axial direction,
    a plurality of magnetic poles having the pair of first magnets, at least one or more of the second magnets, and a part of the rotor core are provided along the circumferential direction,
    the magnetic pole includes:
    a pair of first flux barrier portions each provided on the radially outer side of each of the first magnets along a direction in which each of the first magnets extends when viewed in the axial direction; and
    a pair of second flux barrier portions provided adjacent to the second magnet between the pair of first flux barrier portions in the circumferential direction and disposed adjacent to each of the pair of first flux barrier portions at intervals in the circumferential direction,
    the first flux barrier portion has a first end portion on a side close to the second flux barrier portion adjacent in the circumferential direction,
    the second flux barrier portion has a second end portion on a side close to the first flux barrier portion adjacent in the circumferential direction, a relative position of the first end portion in the circumferential direction with respect to a circumferential center of the magnetic pole is different between the magnetic poles adjacent in the circumferential direction,
a relative position of the second end portion in the circumferential direction with respect to the circumferential center of the magnetic pole is different between the magnetic poles adjacent in the circumferential direction,
the first flux barrier portion includes a first protruding portion that protrudes in a first orthogonal direction orthogonal to a direction in which the first magnets adjacent to the first flux barrier portion extend when viewed in the axial direction,
the first protruding portion protrudes toward the second flux barrier portion adjacent in the circumferential direction in the first orthogonal direction,
an edge of the first magnet located on the radially outer side in the first orthogonal direction when viewed in the axial direction has a linear portion extending in a direction in which the first magnet extends when viewed in the axial direction, and
the first protruding portion protrudes closer to the second flux barrier portion adjacent in the circumferential direction than a first imaginary line that overlaps the linear portion and extends in a direction in which the linear portion extends when viewed in the axial direction.

2. The rotor according to claim 1, wherein
the second flux barrier portion includes a second protruding portion protruding toward the first flux barrier portion adjacent in the circumferential direction,
the second protruding portion protrudes closer to the first flux barrier portion adjacent in the circumferential direction than a second imaginary line extending in a second orthogonal direction orthogonal to a direction in which the second magnet extends when viewed in the axial direction, and
the second imaginary line passes through an end portion of the second magnet on a side where the second flux barrier portion is provided in a direction in which the second magnet extends when viewed in the axial direction.

3. The rotor according to claim 2, wherein
the first imaginary line overlaps a part of the first flux barrier portion when viewed in the axial direction,
the second imaginary line overlaps a part of the second flux barrier portion when viewed in the axial direction,
a first dimension in the circumferential direction in a portion between a third end portion on the radially outer side and the first end portion in a portion of the first flux barrier portion overlapping the first imaginary line when viewed in the axial direction is different between the magnetic poles adjacent in the circumferential direction, and
a second dimension in the circumferential direction in a portion between a fourth end portion on the radially outer side and the second end portion in a portion of the second flux barrier portion overlapping the second imaginary line when viewed in the axial direction is different between the magnetic poles adjacent in the circumferential direction.

4. The rotor according to claim 3, wherein the first dimension and the second dimension are less than half of a distance between the third end portion and the fourth end portion in the circumferential direction.

5. The rotor according to claim 1, wherein
the first flux barrier portion is provided apart on the radially inner side from a radially outer surface of the rotor core,
the rotor core includes an interposition portion positioned between the first flux barrier portion and the radially outer surface of the rotor core, and
a radial minimum dimension of the interposition portion is same between the magnetic poles adjacent in the circumferential direction.

6. The rotor according to claim 5, wherein a radial minimum dimension of a portion of the interposition portion on a side closer to the circumferential center of the magnetic pole in the circumferential direction is equal to or less than a radial minimum dimension of a portion of the interposition portion on a side farther from the circumferential center of the magnetic pole in the circumferential direction.

7. The rotor according to claim 1, wherein
the relative position of the first end portion of one magnetic pole of the magnetic poles adjacent in the circumferential direction is a position closer to the circumferential center of the magnetic pole than the relative position of the first end portion of the other magnetic pole of the magnetic poles adjacent in the circumferential direction, and
the relative position of the second end portion of the one magnetic pole is a position closer to the circumferential center of the magnetic pole than the relative position of the second end portion of the other magnetic pole.

8. The rotor according to claim 1, wherein a ratio of a circumferential distance between the first end portion and the second end portion in the other magnetic pole among the magnetic poles adjacent in the circumferential direction to a circumferential distance between the first end portion and the second end portion in one magnetic pole among the magnetic poles adjacent in the circumferential direction is 0.9 or more and 1.1 or less.

9. The rotor according to claim 8, wherein the circumferential distance between the first end portion and the second end portion in the one magnetic pole and the circumferential distance between the first end portion and the second end portion in the other magnetic pole are same.

10. The rotor according to claim 1, wherein
the pair of first magnets is disposed so as to sandwich the circumferential center of the magnetic pole in the circumferential direction, and
absolute values of angles in a direction in which the pair of first magnets extends with respect to a radial direction passing through the circumferential center of the magnetic pole when viewed in the axial direction are same.

11. The rotor according to claim 1, wherein
in each of the magnetic poles, a pair of the second magnets is provided adjacent in the circumferential direction,
the pair of second magnets extends in directions away from each other in the circumferential direction from the radially inner side toward the radially outer side when viewed in the axial direction, and
the pair of second flux barrier portions is provided on the radially outer side of each of the second magnets along a direction in which each of the second magnets extends when viewed in the axial direction.

12. The rotor according to claim 1, wherein
in each of the magnetic poles, the second magnet is located between the pair of first flux barrier portions in the circumferential direction, and extends in a direction intersecting a radial direction passing through the circumferential center of the magnetic pole when viewed in the axial direction, and the pair of second flux barrier portions is provided on both circumferential sides of the second magnet.

13. A rotary electric machine comprising:

the rotor according to claim 1; and a stator that faces the rotor with a gap interposed therebetween.

14. A drive apparatus comprising:

the rotary electric machine according to claim 13; and a gear mechanism connected to the rotary electric machine.

* * * * *